Sept. 20, 1949.　　　　R. F. SCHMID　　　　2,482,128

RECEIVER PROTECTION CIRCUIT

Filed July 22, 1943

*INVENTOR.*
RUSSELL F. SCHMID.

BY William D. Hall

*ATTORNEY*

Patented Sept. 20, 1949

2,482,128

UNITED STATES PATENT OFFICE 2,482,128

RECEIVER PROTECTION CIRCUIT

Russell F. Schmid, Neptune, N. J., assignor to the United States of America as represented by the Secretary of the Army Application July 22, 1943, Serial No. 495,716

6 Claims. (Cl. 343—13)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to receiver protection and particularly to methods and circuits for preventing the disabling or "knockdown" of the receiver of a pulse-echo object detection system due to the powerful signal potentials which are intermittently impressed upon the receiver.

In accordance with conventional methods of object location, a normally blocked transmitter is intermittently keyed for short time intervals so that pulses of wave energy are transmitted in a desired direction. Any object or body in the path of said energy will reflect or reradiate a portion of the signal back to the source. Due to the transit time of said signal, the time interval between the transmitted pulse and the received echo pulse is a measure of the distance of the reflecting object. Similar techniques, using radio or acoustic waves, are also used for terrain clearance indication, depth sounding, seismic surveying, etc.

Since only a minute portion of the transmitted energy is reflected, it is necessary to transmit pulses of high peak power and use very sensitive receivers having a large number of amplifying stages. Due to the proximity of the transmitter and receiver, it is necessary to provide means to prevent powerful transmitted pulse potentials, or strong echo pulse potentials from nearby objects, from causing "knockdown" of the receiver, since under such conditions the receiver will not respond to any later echoes. This condition is caused by the failure of the R.-C. networks in the receiver biasing circuits to dissipate such potentials before the echoes arrive.

Toward this end, it has been the practice to insert a protecting network between the antenna and the receiver input circuit. Such networks usually include a spark or arc discharge tube which breaks down in response to the powerful transmitted pulse so that it shunts a major portion of the transmitted energy out of the receiver input circuit. When transmission ceases said tube recovers and permits most of the received echo energy to be impressed on the receiver.

A second method of accomplishing this purpose has been to apply a blocking bias to one or more of the tubes in the early amplifying stages of the receiver in synchronism with the pulse transmission so as to prevent saturation of said tubes.

Neither of the abovementioned methods has proven entirely satisfactory. If powerful pulses are transmitted, sufficient energy still gets through the protecting network to saturate the receiver, especially the later stages thereof. The use of the second method is also unsatisfactory with certain types of receivers since they do not recover their sensitivity sufficiently fast so that nearby echoes are lost.

It is an object of this invention to provide means for lowering the response of the receiver during pulse transmission and still permit sufficiently fast recovery of the receiver sensitivity.

This object is accomplished by generating a biasing voltage approximately at the time pulses are transmitted and using said voltage to squelch, or at least greatly reduce, the output of the local oscillator of the receiver, which is of the superheterodyne type. As a result, the intermediate frequency (I. F.) output of the mixer is reduced substantially, so that the disabling of the stages following said mixer is prevented. It has been found that this method permits sufficiently quick recovery of the receiver sensitivity to permit echoes from nearby objects to be received.

For a better understanding of the invention, together with other and further objects thereof, reference is had to the following description taken in connection with the accompanying drawings, wherein like parts are indicated by like reference numerals, and its scope will be pointed out in the accompanying claims.

Figure 1:
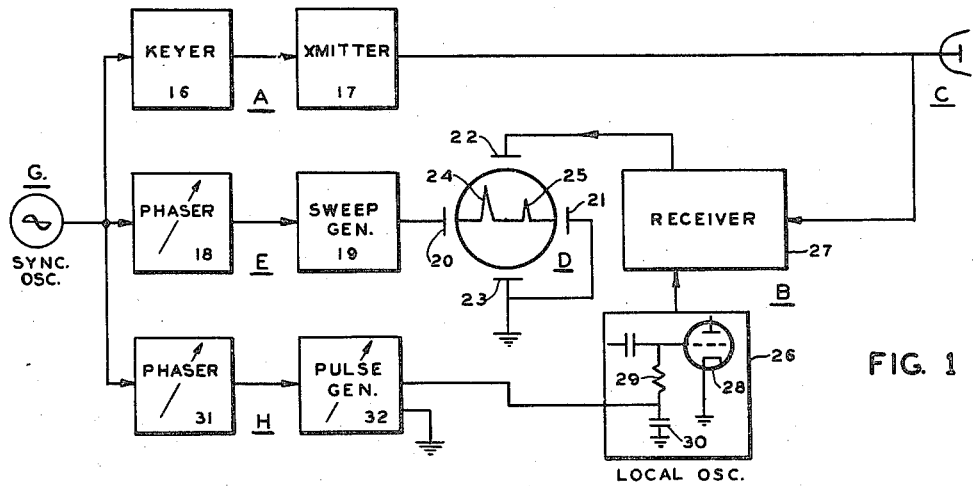
Figure 1 is a block diagram of one form of the invention as applied to a conventional pulse-echo object detection system.

Reference is now made to Figure 1, wherein the invention is shown applied to an otherwise conventional type of pulse-echo system, including a transmitter channel A and receiver channel B, both coupled to a common sharply directional antenna C; although separate antennas may be used. The output of the receiver feeds into an oscilloscope D, the beam of which is periodically displaced by means of a sweep voltage from channel E. An oscillator G synchronizes the transmitter and sweep voltage channels.

Oscillator G generates a sine wave, generally in the audio frequency region. The sine wave is applied to the transmitter channel A, which includes a keyer-modulator 16 and a normally blocked ultra-high frequency radio transmitter 17. Keyer 16 includes a pulse generator which at every cycle, or every few cycles, of energy from oscillator G generates a sharp pulse of considerably shorter duration than said cycle. The resultant output of said pulse generator is a series of sharp pulses of short duration spaced at intervals of considerably longer duration. These pulses are amplified and applied as a positive bias to transmitter 17, which generates trains of ultra-high frequency oscillations for the duration of each pulse.

The output of oscillator G is also applied to sweep voltage channel E, comprising an adjustable and calibrated phase shifter 18, the sine wave output of which is applied to a sweep generator 19, which generates a saw-toothed voltage at every cycle of the sine wave. This saw-tooth voltage is applied to the horizontally deflecting plates 20 and 21 of a conventional cathode ray oscilloscope which also includes a pair of vertically deflecting plates 22 and 23. By adjusting phase shifter 18, any desired point of the oscilloscope sweep can be synchronized with the pulsing of transmitter 17.

For more detailed descriptions of suitable types of transmitter and keyer-modulator networks in channel A, reference is made to the applications of J. R. Moore, Serial Nos. 467,268 and 467,269, both filed Nov. 28, 1942; Serial No. 467,269 is now Patent No. 2,462,885 issued March 1, 1949; J. W. Marchetti, Serial No. 477,782, filed Mar. 3, 1943; and M. D. Baller, Serial No. 477,103, filed Feb. 25, 1943. For details of circuits suitable for use in the oscilloscope sweep channel E, reference is made to the applications of J. R. Moore, Serial No. 467,263 and 467,264, both filed Nov. 28, 1942. It is to be distinctly understood, however, that other known forms of these networks are equally applicable.

The receiver channel B is of the superheterodyne type and is shown in two sections. Section 26 represents the local oscillator and section 27 contains the usual amplifying and detecting circuits of the receiver. Said receiver can also be preceded by well known means, such as spark gap networks or limiting amplifiers, to protect the receiver from the relatively powerful direct signal from the transmitter. The signals from antenna C are selected and the pulse component of the signal detected and amplified by the receiver and impressed upon the vertically deflecting plates 22 and 23 of oscilloscope D.

Referring now to the operation of the system, the pulses of R. F. energy from transmitter 17 are radiated through antenna C and directly impressed on the receiver. The radiated energy is, upon striking an object, reflected or reradiated back toward the antenna. Both transmitted and received pulses therefore appear in the receiver output and vertically deflect the oscilloscope trace. Due to the transit time of the received pulses, the indication 24 of the main transmitted pulse will appear separated from a reflected pulse indication 25 by a distance proportional to said transit time and hence the distance of the reflecting object.

The distance of said object can be indicated by means of suitable calibrations on the oscilloscope screen. Or, the distance can be measured by adjusting calibrated phase shifter 18 so that the transmitted pulse indication 24 is positioned at a given datum position of the trace. This position represents the zero position of the phase shifter. The phase shifter is then readjusted until the received echo pulse indication 25 is moved to the same datum position and the reading on the scale noted. Since the transit time of the reflected signal is the equivalent of a phase shift, the phase shifter scale reading is a measure of the distance of the reflecting object and said scale can therefore be calibrated directly in terms of distance. For further details of this method, reference is made to the application of S. H. Anderson, Serial No. 470,376, filed Dec. 28, 1942.

The term "echo," as used herein, is not to be restricted to signals which are reflected or passively reradiated by a body. This term is also used to signify any response to a signal, e. g. that obtained by means of a normally inoperative transmitter located on said body and which, when keyed by the transmitted pulse, automatically functions to send an answering pulse, either on the same or on a different frequency.

As thus far described, the system is conventional and forms a part of this specification only for the purpose of describing one typical system to which this invention is applicable. It is to be understood that the invention is equally applicable to other known pulse-echo systems using different methods of signal presentation and range determination.

For reasons above mentioned, it is necessary to reduce or deaden the response of the receiver to the powerful transmitted signal and to relatively powerful nearby echoes. In accordance with this invention a negative bias voltage is obtained from a blocking channel H and applied to the grid of the local oscillator tube 28, so that during the occurrence of said powerful signals the local oscillator output is reduced or entirely eliminated and substantially no I. F. voltage is generated. Thus disabling of the I. F. amplifier tubes is prevented.

The timing of the blocking bias is also controlled by synchronizing oscillator G. The sine wave output of this oscillator is first adjusted in phase by adjustable phase shifter 31 and then used to control a pulse generator 32, which at every cycle of the sine wave voltage generates a negative square wave which is of considerably shorter duration than said cycle. A control is provided in pulse-generator 32 to permit adjustment of the duration of said square wave. The latter is then applied across condenser 30 and from there to the grid of tube 28 through a high resistance grid resistor 29. Condenser 30 is of low impedance to the R. F. energy of the oscillator but of high impedance to the pulse energy.

Phase shifter 31 is adjusted until the blocking bias is generated in synchronism with the pulse transmission. By adjusting pulse generator 32, the duration of this bias can be made such as to block the oscillator for all or part of the time of pulse transmission. Or this duration of blocking can be made long enough to eliminate from the receiver output the entire transmitted pulse as well as strong nearby echoes.

Figure 2:
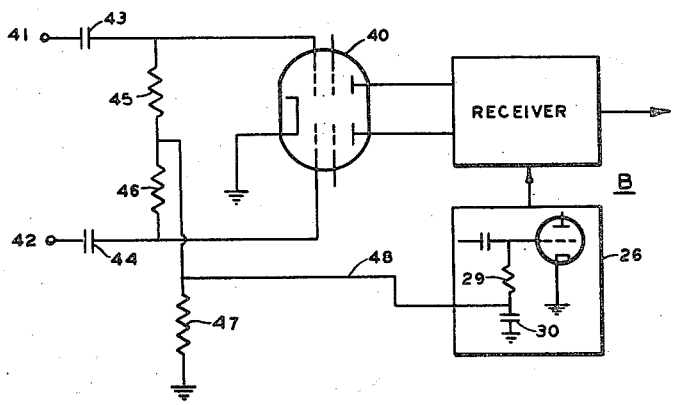
Figures 2 and 3 are schematic diagrams of alternative forms of the invention.

Figure 2 shows a simpler circuit for deriving the blocking potential. This circuit shows a dual tetrode or pentode tube 40 operated as a push-pull R. F. amplifier. The input grids of said tube are excited in opposite phase from input terminals 41 and 42 of the receiver, said terminals being connected to suitable points of a tunable antenna transmission network. Grid condensers 43 and 44 and grid leak resistors 45 and 46 are provided, said resistors being connected to ground through resistor 47.

In the presence of a strong signal, considerable negative bias voltage is developed due to grid current flow during the positive swings of said signal.

This negative bias voltage reduces the response of amplifier tube 40 to the signal. In addition, the portion of this negative bias which is developed across resistor 47 is also applied, through lead 48, as a blocking bias to the grid of the local oscillator tube. The time constant of the biasing condensers and resistors should be short enough to substantially follow the pulse envelope.

With this circuit, sufficient biasing voltage is obtained to block the local oscillator immediately after the commencement of pulse transmission, so that only the leading edge of the transmitted pulse gets through the receiver and appears on the oscilloscope screen.

Figure 3:
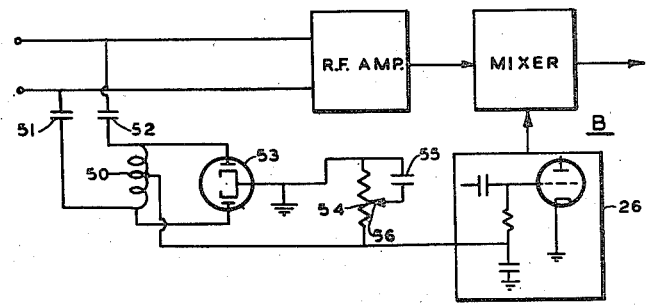

Still another method of generating a blocking potential is shown in Figure 3. A coil 50, which may be resonated to the incoming signal frequency, is connected to the receiver input terminals through blocking condensers 51 and 52. The signal potentials across the coil are full wave rectified by dual diode 53, the resultant D. C. potential appearing across load resistor 54, all part of which is shunted by R. F. bypass condenser 55, depending on the position of slider 56. A portion of the D. C. voltage is applied as a negative blocking bias to the grid of local oscillator 26. The time constant of R.-C. circuit 54—55 should be small enough to substantially follow the pulse envelope.

The strong transmitted signal generates enough bias voltage to completely block the oscillator so that substantially no I. F. appears in the mixer output. The oscillator can also be kept blocked during the occurrence of strong echoes from nearby objects by slightly increasing the time constant of R.-C. circuit 54—55. This can be done by moving slider 56 so that condenser 55 shunts a greater portion of resistor 55.

In the circuits in Figures 2 and 3, blocking of the oscillator is controlled by the incoming signals. They are therefore suitable for use with asynchronous types of pulse-echo object location systems.

It has been found that the local oscillator resumes its oscillating condition substantially immediately after pulse transmission ceases, thus permitting the receiver to attain its full sensitivity to nearby echoes.

In one typical construction of this invention, the following approximate component values were found suitable: Tube 40 is a type 832 dual pentode; resistors 29, 47, and 54 are 25,000 ohms each; resistors 45 and 46 are 13,000 ohms each; condenser 30 is 25 mmf.; condensers 43 and 44 are 100 mmf. each; and condenser 55 is .001 mfd. These values are, however, exemplary and may be changed to suit different operating conditions.

Instead of blocking the oscillator by making the grid of the oscillator tube negative with respect to ground, the same result can be obtained by making the cathode of the tube positive with respect to ground.

There have been described several circuits for limiting the response of a pulse-echo superheterodyne receiver during pulse transmission by blocking the local oscillator of said receiver. It should be understood, however, that the invention is applicable to other systems using similar types of signals. Communication systems to which this invention is especially applicable are those in which several transmitters and receivers operate on the same channel on a time sharing basis, e. g. duplex and multiplex systems.

While there have been described what are at present considered preferred embodiments of the invention, it will be obvious to those skilled in the art that various changes and modifications may be made therein without departing from the invention, and it is therefore, aimed in the appended claims, to cover all such changes and modifications as fall within the true spirit and scope of the invention.

I claim:

1. In a pulse-echo object location system including a normally inoperative transmitter, periodic means to render said transmitter operative for predetermined time intervals spaced at considerably longer time intervals, a superheterodyne receiver upon which the transmitted signals and echoes thereof are impressed, said receiver including an electron tube local oscillator, and means to control the output of said receiver for predetermined time intervals, said last named means comprising a pulse generator under the control of said periodic means, means to control the duration of the pulse output of said generator, means to impress said output upon at least one of the electrodes of said tube in such manner that the output of said local oscillator is varied for at least the duration of each pulse.

2. In a pulse-echo object location system including a normally inoperative transmitter, periodic means to render said transmitter operative for predetermined time intervals spaced at considerably longer time intervals, a superheterodyne receiver upon which the transmitted signals and echoes thereof are impressed, said receiver including an electron tube local oscillator, and means to reduce the output of said receiver for predetermined time intervals, said last named means comprising a negative pulse generator under the control of said periodic means, means to control the duration of the pulse output of said generator, means to vary the phase of said pulse output, and means to impress said output upon at least one of the electrodes of said tube in such manner that the output of said local oscillator is suppressed for the duration of each pulse.

3. In a high frequency system, a high frequency transmitter, a receiver of the superheterodyne type responsive under normal operation to energy at substantially the operating frequency of said transmitter and susceptible to be adversely affected thereby, said receiver including a local oscillator and a mixer in which said oscillator produces an intermediate frequency, means for preventing the adverse effect upon said receiver during operation of said transmitter including means for producing a frequency other than said intermediate frequency in said mixer while said transmitter is in operation.

4. Apparatus according to claim 3 wherein said last-mentioned means comprises means for producing a D. C. potential from the signal from said transmitter, and means for applying said potential to cut off said oscillator.

5. Apparatus according to claim 3 wherein said last-mentioned means comprises a parallel combination of a resistor and condenser in the output of the antenna, the time constant of said resistor and condenser being such that the voltage across the resistor substantially follows the envelope of the transmitter signal, and means to impress at least a portion of said voltage upon at least one electrode of said oscillator tube in such direction as to cut off said oscillator.

6. Apparatus according to claim 3 wherein said last-mentioned means comprises a rectifying network in the input circuit of said receiver for changing a portion of the energy in said input circuit to a D. C. potential, and means responsive to said potential to cut off the local oscillator.

RUSSELL F. SCHMID.

REFERENCES CITED

The following references are of record in the file of this patent:

UNITED STATES PATENTS

| Number | Name | Date |
|---|---|---|
| 2,055,883 | Terry | Sept. 29, 1936 |
| 2,101,668 | Bishop | Dec. 7, 1937 |
| 2,128,556 | Clay | Aug. 30, 1938 |
| 2,144,935 | Roberts | Jan. 24, 1939 |
| 2,181,568 | Kotowski et al. | Nov. 28, 1939 |
| 2,294,411 | Lay | Sept. 1, 1942 |